United States Patent
Cazzavillan et al.

(10) Patent No.: US 7,030,586 B2
(45) Date of Patent: Apr. 18, 2006

(54) METHOD FOR CO-ORDINATING AND SYNCHRONIZING THE MOVEMENT OF SERVO-ASSISTED AXES

(75) Inventors: Adriano Cazzavillan, Sovizzo (IT); Pietro Magnabosco, Trissino (IT); Dario Zatton, Vicenza (IT)

(73) Assignee: QEM S.r.l., Montebello Vicentino (IT)

( * ) Notice: Subject to any disclaimer, the term of this patent is extended or adjusted under 35 U.S.C. 154(b) by 0 days.

(21) Appl. No.: 10/481,362

(22) PCT Filed: Jul. 4, 2002

(86) PCT No.: PCT/EP02/07421

§ 371 (c)(1),
(2), (4) Date: Mar. 24, 2004

(87) PCT Pub. No.: WO03/005135

PCT Pub. Date: Jan. 16, 2003

(65) Prior Publication Data

US 2004/0164698 A1 Aug. 26, 2004

(30) Foreign Application Priority Data

Jul. 4, 2001 (IT) .............. VI2001A0149

(51) Int. Cl.
*G05B 19/18* (2006.01)
*G05B 11/32* (2006.01)
*H02P 7/36* (2006.01)

(52) U.S. Cl. ............ 318/625; 318/570; 318/571; 318/572; 700/188; 713/400; 345/771

(58) Field of Classification Search ........ 318/560–566, 318/607–632, 568.1; 700/63, 170, 186
See application file for complete search history.

(56) References Cited

U.S. PATENT DOCUMENTS

| | | | |
|---|---|---|---|
| 5,642,024 A | | 6/1997 | Okada et al. |
| 5,659,480 A | * | 8/1997 | Anderson et al. ............ 700/186 |
| 5,966,908 A | * | 10/1999 | Philipp et al. ................. 53/450 |
| 5,997,778 A | * | 12/1999 | Bulgrin ....................... 264/40.1 |
| 6,084,372 A | * | 7/2000 | Saylor ........................ 318/568.1 |
| 6,107,769 A | * | 8/2000 | Saylor et al. ................ 318/600 |
| 6,246,201 B1 | * | 6/2001 | Aderek et al. .............. 318/632 |
| 6,539,489 B1 | * | 3/2003 | Reinert ........................ 713/400 |
| 6,815,917 B1 | * | 11/2004 | Fujinawa ..................... 318/560 |
| 6,888,334 B1 | * | 5/2005 | Fujibayashi et al. ......... 318/625 |

(Continued)

FOREIGN PATENT DOCUMENTS

EP 1308809 A2 * 5/2003

*Primary Examiner*—Paul Ip
(74) *Attorney, Agent, or Firm*—Hedman & Costigan

(57) ABSTRACT

The invention regards a method for co-ordinating and synchronizing the movement of servo-assisted axes in machines and apparatuses which execute various industrial applications. The method in object is applied in the programming of electronic control systems using specific commands collected in a particular table subdivided into sectors and known as a "CAM TABLE", according to a programming technique known as "CAMMING". The fundamental characteristic of the devised method is given by the fact that inside the aforementioned sectors of the CAM TABLE are described, through the use of a special operating code comprising a plurality of operating instructions, both the position relationships and the virtual laws of motion which bind a first reference axis known as the "MASTER axis", and each of the other axes known as "SLAVE axes" together.

7 Claims, 3 Drawing Sheets

U.S. PATENT DOCUMENTS

| | | | |
|---|---|---|---|
| 6,958,586 B1* | 10/2005 | Tanimoto | 318/254 |
| 2002/0045957 A1* | 4/2002 | Otsuki et al. | 700/63 |
| 2002/0092271 A1* | 7/2002 | Kovacs et al. | 53/451 |
| 2003/0090230 A1* | 5/2003 | Fujibayashi et al. | 318/625 |
| 2003/0191553 A1* | 10/2003 | Isohata | 700/170 |
| 2003/0233906 A1* | 12/2003 | Weinhofer et al. | 74/568 M |
| 2003/0234817 A1* | 12/2003 | Weinhofer et al. | 345/771 |
| 2004/0059460 A1* | 3/2004 | Endo | 700/188 |
| 2004/0100218 A1* | 5/2004 | Fujinawa | 318/571 |
| 2005/0174088 A1* | 8/2005 | Tanimoto | 318/807 |

* cited by examiner

METHOD FOR CO-ORDINATING AND SYNCHRONIZING THE MOVEMENT OF SERVO-ASSISTED AXES

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF PARTIES TO A JOINT RESEARCH AGREEMENT

Not Applicable

INCORPORATION-BY-REFERENCE OF MATERIAL SUBMITTED ON A COMPACT DISK

Not Applicable

BACKGROUND OF THE INVENTION

1. Field of the Invention

The invention regards a method for co-ordinating and synchronising the movement of servo-assisted axes intended for realising a certain application in various sectors of industry, such as:

flying cuts and interpolation jobs, both linear and circular, on plastic, metal sheet and cardboard;
product packaging;
winding of cable, metallic wire, strap, etc., with strand-guiding functions;
layering of fabrics or pastry with folding machines, mainly used in the textile and food industry;
silk-screen or flexographic printing with circular plates.

2. Description of Related Art

It is known that in the realisation of operating machines, in particular industrial ones which are automatic controlled by PLCs (Programmable Logic Controllers) or by a PC (personal computer), the need to co-ordinate and synchronise the movement of many servo-assisted axes belonging to the same machine crops up ever more frequently.

The electronic controls to satisfy the aforementioned requirement use specific commands, collected in a movement program which is executed in sequence, with which both the type of "trajectory"—understood to mean the function which links the displacements of two or more axes to each other in space—and the "law of motion" of the axes themselves—understood to mean the function which describes the progression of space in time relative to the displacement of each axis.

The "transfer function" of the law of motion is the result of two fundamental magnitudes in the movement of the axes: speed and acceleration. By analysing the progression of space in time and by carrying out first and second derivative operations the speed and acceleration can be worked out as a function of time. In a program for moving many axes some fundamental parameters (speed and acceleration) have to be defined for each axis, upon the basis of which the specific laws of motion for each individual axis shall be calculated, said laws, applied simultaneously, going on to produce the desired trajectories in space.

There are two main systems existing on the market for the description and consequent execution of trajectories for executing the co-ordinating and synchronising functions of axes.

The first system is generally known as "numeric controls" and is based upon the principle of the decomposition of complex trajectories, usually described under the form of polynomial or trigonometric functions, in three types of elementary trajectories, which are:

1. point-to-point trajectories;
2. trajectories by linear interpolation;
3. trajectories by circular interpolation.

A complex trajectory is thus carried out as a succession of elementary trajectories. If the elementary trajectories are then combined with each other to be applied simultaneously on many axes complex interpolations are obtained such as tangential, helical and spherical ones.

The "numeric controls" just described require a high processing capacity which is commonly executed by sophisticated processors, such as personal computers, with the help of specific software packages. The use thereof is usually foreseen in the cases of treatments with a medium-high complexity.

The second method in use for coordinating and moving servo-assisted axes is known as "CAMMING" and is based upon the decomposition of the global motion of each individual axis into elementary movements, each related solely to the motion of a first axis, called the reference "MASTER axis" which is common to all the other axes, called "SLAVE axes".

The MASTER axis can be either a real axis or a virtual axis, that is a mathematical algorithm which simulates the ideal behaviour of an axis which executes a point-to-point trajectory. The trajectory of the MASTER axis is decomposed into a finite number of elements, where each element can be described as an absolute or incremental co-ordinate, and with each element is associated the corresponding absolute co-ordinate of every single SLAVE axis.

In practice, if the absolute positions of the MASTER axis are represented as x-coordinates of a Cartesian x/y plane and the corresponding absolute positions of the SLAVE axis relative to the same instant considered are represented as y-coordinates, a succession of points which can be connected together which describe a trajectory which is commonly referred to as "cam" is obtained. The succession of points thus obtained is put into a table, known as "CAM TABLE", which thus contains an association between the absolute position which each of the axes to be controlled, i.e. every single SLAVE axis, must take up, for every position of the MASTER axis.

In mathematical terms, calling the spatial coordinate of the SLAVE Qs and the spatial coordinate of the MASTER Qm, the "CAM TABLE" describes the function $Qs=f(Qm)$. During the execution of the movement, the position of the MASTER directly determines the position of the SLAVE; consequently, the variations in time of the position of the MASTER determine the corresponding variations of the individual SLAVES, and thus the dynamic progression thereof.

Still expressing the concept in mathematical terms, calling the time function describing the motion of the MASTER $Qm(t)$, the function of the motion of the SLAVE is determined by the function $Qs(t)=f(Qm(t))$.

Each line of the aforementioned "CAM TABLE", also known as cam "sector", is calculated using a personal computer with suitable software programs according to the "geometry" of the cams and their dynamic progression. The same programs allow, moreover, to simulate and visualise the laws of motion.

Once calculated, the "CAM TABLE" is "downloaded" into the electronic device which manages the moving.

The advantage given by the CAMMING technique with respect to a "numeric control" is in the simplification of the calculation required of the electronic device which executes the trajectories of the single axes, the table being the result of processing executed beforehand.

This same technique—which in any case represents a substantial simplification with respect to a "numeric control"—nevertheless has big drawbacks in its application.

A first drawback is given by the fact that the calculations necessary for quickly completing the points of a "CAM TABLE", taking into account the maximum accelerations and decelerations allowed of the SLAVE axis, are rather complex and require the systematic use of a personal computer.

A further drawback consists of the fact that the "CAM TABLE" completed on the basis of complex calculations cannot be varied "on the spot" in the electronic devices which manage the moving. To allow variations many tables are usually calculated, which can however only be switched with each other in a few determined positions of the MASTER axis. The use of multiple tables, besides requiring greater memory in the electronic device, does not at all eliminate the drawback of rigidity in the CAMMING technique applied to the control of axes.

With the invention in object it is intended to obtain, as an alternative to conventional CAMMING, a system for controlling axes, whilst still guaranteeing the simplicity of processing by electronic devices which manage the moving, overcomes the aforementioned limits and drawbacks.

A first purpose of the method according to the invention is that of being able to evaluate the dynamic behaviour of servo-assisted axes without making use of special SOFTWARE programs on a personal computer, which, as stated above, require the entry of a large amount of data and, moreover, are not always available on line during treatment.

Another purpose of the same method is to allow laws of motion to be applied to the controlled axes according to mathematical functions of various types, such as linear, trigonometric or special.

A further purpose of the method is to allow the manipulation on the spot of the calculations, both of the MASTER axis and of the SLAVE axes.

Yet another purpose of the method is to allow the execution of unconditioned jumps in different positions inside the same described trajectories.

BRIEF SUMMARY OF THE INVENTION

The aforementioned purposes are achieved by the invention in object which regards a method for coordinating and synchronizing the movement of servo-assisted axes which can be applied to electronic control systems using specific commands collected in a movement program with which the type of "trajectory" which said servo-assisted axes must carry out to realise a certain application in various sectors of industry are defined.

The method itself is based upon the principle, analogous to CAMMING, of the decomposition of the motion into elementary movements and of the description of the movements of the individual SLAVE axes according to a single MASTER axis, real or virtual, which functions as a reference and, in accordance with the content of the first claim, is characterised in that inside the sectors of the aforementioned CAM TABLE, besides the position relationships, the virtual laws of motion which bind the aforementioned MASTER axis and each of the SLAVE axes together are described; in that such laws are carried out through the use of a special code comprising a plurality of operating instructions; in that the same laws, associated with the position-incrementing information defined for the MASTER axis and for each of the individual SLAVE axes, determine a direct association between the reference space of said MASTER axis and the corresponding incremental space which each of said SLAVE axes must execute.

It is important to note, to highlight the innovative element introduced by the present invention, that conventional "CAM TABLES" provide information only on the trajectory executed by each SLAVE axis according to the position of the MASTER axis, but do not contain any direct information on the law of motion, and therefore on the dynamic behaviour, with which each SLAVE axis must move during the execution of the relative trajectory.

BRIEF DESCRIPTION OF THE SEVERAL VIEWS OF THE DRAWINGS

To go into the detail of the description we refer to the help of the graphical illustrations shown in the attached tables, where.

DETAILED DESCRIPTION OF THE INVENTION

Figure 3:
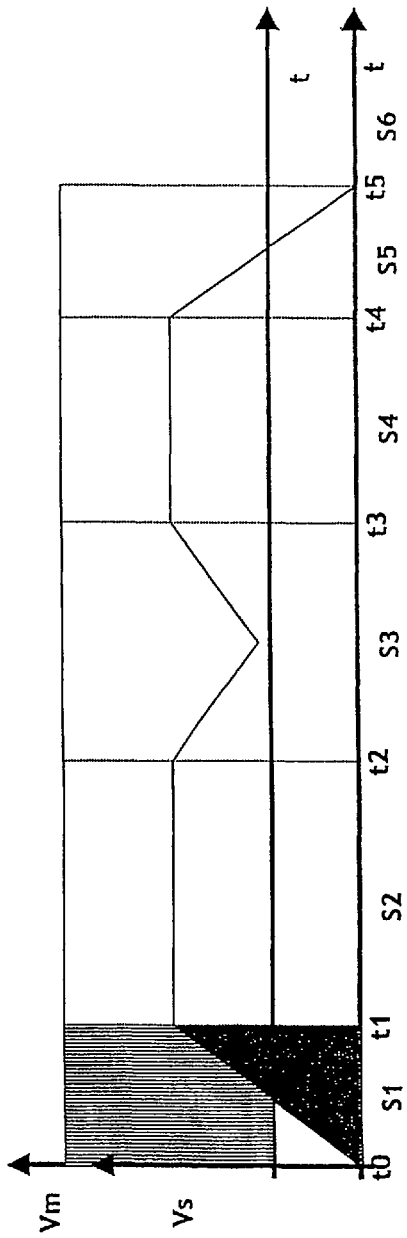
FIG. 3 shows the aforementioned two graphs partially superposing each other and added to with part of a table which, as an example, shows some sectors with the main operating instructions inserted and the relative comment alongside.

Each sector of the table, compiled with the method of the present invention and described as an example in FIG. 3, contains the information on the motion of the individual SLAVE axes according to a single MASTER axis and consists of at least three fundamental operating instructions:

a first CodeQm instruction which defines the incremental position of the MASTER axis expressed in units of measurement and only with positive increments;

a second CodeQs instruction which defines the incremental position of the SLAVE axis considered, expressed in units of measurement and with both positive and negative increments;

a third CodeG instruction which defines the law of motion of the same SLAVE axis in going through the space defined by the second instruction (CodeQs) at the same time in which the MASTER axis goes through the space defined by the first instruction (CodeQm).

The function which describes the law of motion of the SLAVE axis is the one taken in the preferred condition of the MASTER axis moving at a constant speed.

From the three magnitudes inserted in the instructions described above it is possible to directly calculate the actual displacement of the SLAVE axis according to any displacement carried out by the MASTER axis executing simple mathematical operations.

The simplification in the numerical processing is given by the assumption of describing the law of motion of the SLAVE axis in the constant speed condition of the MASTER axis. Since speed is by definition the distance/time relationship, the MASTER taking on a constant speed means considering distance and time to be two directly proportional magnitudes. This implies that the law of motion described by the aforementioned third CodeG instruction is in reality independent from the time and establishes a direct proportionality between the distance crossed by the MASTER and that crossed by the SLAVE. The actual displacement of the SLAVE is obtained by applying the aforementioned law of proportionality to the absolute increment of the distance defined in the aforementioned second CodeQs instruction with respect to the absolute increment defined in the aforementioned first CodeQm instruction. It should be noted how the condition of describing the law of motion of the SLAVE with the MASTER at a constant speed does not force the MASTER to take up, in the execution of the movement, a constant speed: it is only an assumption which allows the laws of motion to also become laws of proportionality between distances independently from time.

In order to better clarify that which has just been outlined, let us consider an example.

Figure 1:
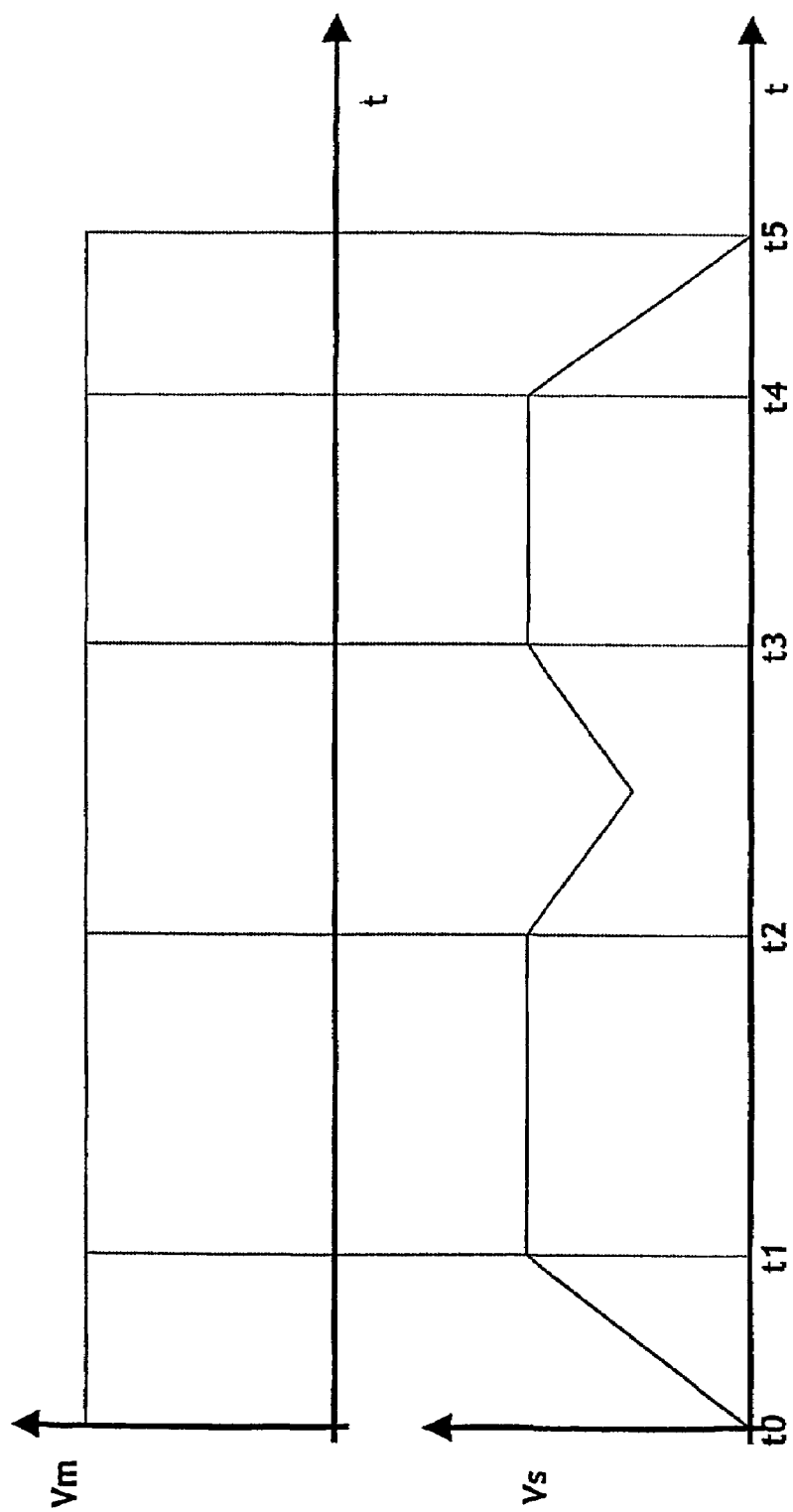
FIG. 1 shows the progression of the MASTER axis compared with that of a SLAVE axis in two Cartesian speed/time graphs.

Referring to FIG. 1 let us consider analysing a displacement described by the first sector of the table, indicated in the graph between the time intervals t1 and t0. In the first sector the law of motion of the SLAVE given by CodeG—with the MASTER speed Vm constant—is a linearly increasing speed Vs corresponding to a constant acceleration.

Figure 2:
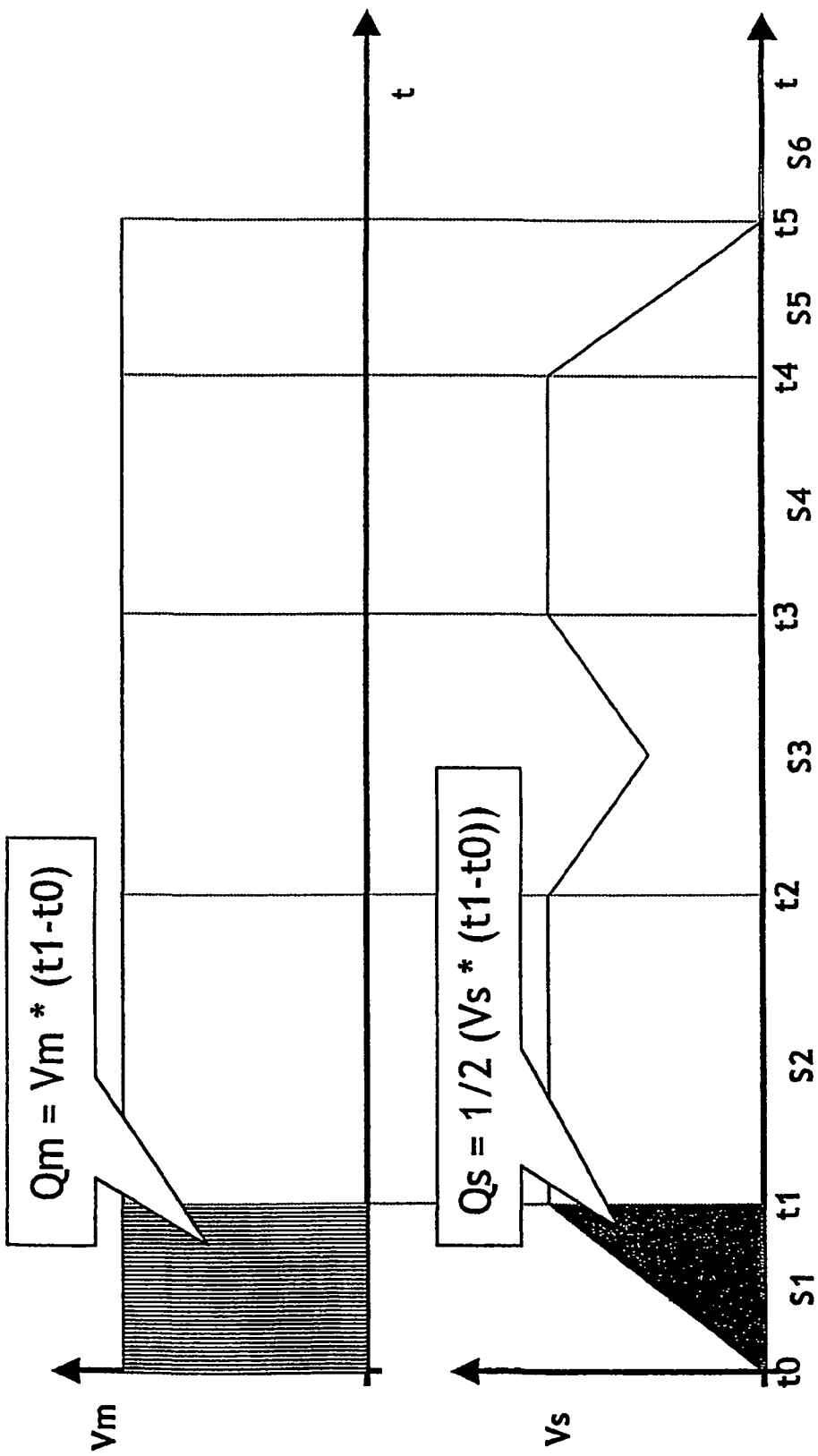
FIG. 2 highlights the spatial magnitudes taken from the progressions described in FIG. 1.

The distance covered by the MASTER in time (t1−t0) is indicated by the area of the graph Vm in FIG. 2 and is $Qm=Vm*(t1-t0)$. The distance covered by the SLAVE still in the same time (t1−t0) is the area indicated by the graph Vs still in FIG. 2, i.e. $Qs=\frac{1}{2}*Vs*(t1-t0)$. The proportionality relationship between the distances covered Qs and Qm in the first sector is therefore $Qs/Qm=\frac{1}{2}*Vs/Vm$, which is a known magnitude since it is expressed precisely by the function described by CodeG. Such a law of proportionality is applied, in each sector, to work out the actual incremental displacement to be applied to the SLAVE starting from the elements in a known position: these are the actual increment carried out by the MASTER and the overall increments which MASTER and SLAVE have to carry out in the entire sector and which are described by CodeQs and CodeQm.

The sectors are contained in a table, an example of which is shown in FIG. 3, where for each sector there is at least the information described by the aforementioned fundamental operating instructions CodeQm, CodeQs and CodeG defined earlier. The table can be subdivided into a variable number of sectors, for example up to 128, corresponding to the same number of time intervals. By executing the various sectors in succession the execution of the desired trajectory according to the desired laws of motion are obtained.

The system for describing the movement of the SLAVE axes according to a MASTER axis according to the present invention, as stated, involves substantial advantages with respect to conventional "CAM TABLES".

The first advantage is first of all the reduction in the number of calculations necessary for working out the increments of the distances, requiring only the application of elementary geometric concepts.

Moreover, the cam can start from any position, it can also end in any position, it can be changed "on the spot", it can have an indefinite length and it can change the MASTER axis "on the spot".

A further advantage is given by the reduction in the amount of information present in the table. Indeed, each sector contains information on a portion whose length depends upon CodeQm and CodeQs, which can take up a whole range of permitted values: with a single sector very long portions can also be defined, which in conventional "CAM TABLES" would take up a lot more memory.

In addition, the setting of the maximum possible speed to be assigned to the MASTER axis is worked out from the speed, acceleration and deceleration limits of each of the SLAVE axes shown in the corresponding Cartesian speed/time graph, and vice-versa.

The formulation of the law of motion of each of the SLAVE axes according to the time allows the dynamic performances required by industrial application to be evaluated immediately, a thing which can be done with an analysis on a personal computer carried out beforehand with a conventional "CAM TABLE".

The method in object, moreover, foresees the possibility of adding to the fundamental operating instructions defined above with a plurality of auxiliary operating instructions which, associated with the aforementioned third CodeG fundamental operating instruction, describe various laws of motion for each of the SLAVE axes. Such laws shall be those most suitable for allowing any execution of trajectories in the distance between two or more of said servo-assisted axes related to each other.

The same method can also be used in CAMMING applied in cascade, i.e. when one of the SLAVES of a first table becomes the MASTER for a second table. Usually, this system is not used because it is complicated and not very reliable. With the overall reduction in the memory space required, together with the simplifications in the calculation obtained, the invention allows CAMMING in cascade to be applied with greater simplicity and reliability.

From that which has been described and illustrated above, the advantages of the devised method with respect to the known ones are clear. The advantages outlined above for the devised method are therefore substantially achieved through the creation of the instructions contained in CodeG and in the auxiliary ones associated with the first ones.

These advantages, above all the simplicity of calculation and the reduction in the necessary memory capacity, allow the fields in which slaved moving techniques for axes are currently used to be extended. An example of this is remote control of axes. Up to now the control techniques applied have not allowed a reliable implementation of systems controlled from a distance. The method according to the invention allows the laws of control to be described much more simply.

This advantage translates into a faster and more reliable transmission of data, which thus allows the use of INTERNET or of other transmission systems. The examples of application are numerous and they can be found in various fields of application.

The variants which can be introduced in the application of the method itself can be many, but they all find their inspiration in the fundamental concepts outlined above. Every variant in application must therefore be deemed to fall within the scope of protection of the present invention.

The invention claimed is:

1. Method for co-ordinating and synchronizing the movement of servo-assisted axes for electronic control systems using specific commands comprising dividing the global motion of said axes into elementary movements of each individual axis, the first of said axes comprising a master axis which is a real or virtual reference point and having a slave axis which is related solely to the motion of said master axis through a corresponding table identified as a cam table which comprises a plurality of lines identified as sectors in each of which the position must be taken up by each slave axis which is related to every position of said master axis, said method comprising providing inside said sectors of said cam table, the position relationships, the virtual laws of motion which bind said master axis and each of said slave axes together are described; in that said laws are carried out through the use of a special code comprising a plurality of operating instructions associated with position incremental information defined for said master axis and for each of said individual slave axes, for determining a direct association between the reference point of said master axis and the corresponding incremental space of said slave axes.

2. Method according to claim 1, wherein said master axis and each of said slave axes together assume the speed of said master axis to be constant to allow the positions of said master axis and of each of said slave axes to be represented as areas in Cartesian speed/time graphs.

3. Method according to claims 1 or 2 wherein the setting of the maximum possible speed to be assigned to said method according to claim 1, wherein said master axis and each of said SLAVE axes together assume the speed of said master axis to be constant to allow the positions of said master axis to be calculated from the acceleration, deceleration and speed limits of each of said SLAVE axes and vice-versa.

4. Method according to claims 1 or 3 wherein said operating instructions inserted in each sector of said cam table comprise at least one plurality of fundamental operating instructions of which a first instruction defines the incremental position of said master axis expressed in measurement units and only with positive increments; a second instruction defines the incremental position of one of said slave axes expressed in measurement units and with both positive and negative increments; a third instruction which defines the motion each of said slave axes covering the distance defined in said second instruction at the same time in which said master axis covers the distance defined in said first instruction.

5. Method according to claim 4 wherein said third instruction comprises a plurality of numerical codes each of which is associated a particular function of each of said slave axes.

6. Method according to claim 1 characterised in that in each sector of said cam table said fundamental operating instructions are added to with a plurality of auxiliary operating instructions which describe in greater detail the progression of the increments in positon of every single one of said slave axes, said auxiliary operating instructions, associated with said fundamental operating instructions, being suitable for describing various laws of motion of each of said slave axes and for allowing the execution of any trajectory in space.

7. Method according to claim 1 wherein in said cam table any one of said slave axes is suitable for becoming, in turn, a further master axis of a new cam table for the purpose of realizing a cascade regulation.

* * * * *